United States Patent
Yu et al.

[11] Patent Number: 5,885,512
[45] Date of Patent: Mar. 23, 1999

[54] METHOD OF TREATING PREFORMED FLEXIBLE IMAGING BELTS TO FORM RIPPLE-FREE AND DIMENSIONALLY PRECISE BELTS

[75] Inventors: Robert C. U. Yu, Webster; Donald C. VonHoene, Fairport; Anthony M. Horgan, Pittsford; Richard L. Post, Penfield; Satchidanand Mishra, Webster; Edward F. Grabowski, Webster; Bing R. Hsieh, Webster, all of N.Y.

[73] Assignee: Xerox Corporation, Stamford, Conn.

[21] Appl. No.: 941,914

[22] Filed: Oct. 1, 1997

[51] Int. Cl.$^6$ .......................... B29C 55/24; B29C 61/02; B29C 71/02

[52] U.S. Cl. .......................... 264/512; 264/573; 264/230; 264/342 R; 264/346

[58] Field of Search ...................................... 264/510, 573, 264/512, 320, 230, 346, 342 R, 342 RE

[56] References Cited

U.S. PATENT DOCUMENTS

| | | | |
|---|---|---|---|
| 4,587,075 | 5/1986 | Butcher et al. | 264/573 |
| 4,711,833 | 12/1987 | McAneney et al. | 430/131 |
| 4,747,992 | 5/1988 | Sypula et al. | 264/130 |
| 5,021,109 | 6/1991 | Petropoulos et al. | 156/137 |
| 5,039,598 | 8/1991 | Abramsohn et al. | 430/347 |
| 5,100,628 | 3/1992 | Griffths et al. | 427/374.1 |
| 5,143,573 | 9/1992 | Ammon et al. | 156/294 |
| 5,376,491 | 12/1994 | Krumberg et al. | 430/136 |
| 5,518,854 | 5/1996 | Yu et al. | 430/133 |

FOREIGN PATENT DOCUMENTS

5-45897  2/1993  Japan ..................................... 430/127

*Primary Examiner*—Jan H. Silbaugh
*Assistant Examiner*—Martin Fallon

[57] ABSTRACT

A method of treating a preformed flexible imaging belt including providing a rigid cylindrical support drum having a precisely predetermined outer circumference, a first end and a second end, providing a preformed flexible electrostatographic imaging belt, circumferentially expanding the belt with a flowing fluid under pressure until the circumference of the inner surface of the belt adjacent the first end of the drum is stretched to a new dimension of at least about 0.1 percent greater than the outer circumference of the rigid support drum while maintaining the belt below the elastic limit of the belt to smooth out physical defects, sliding the belt onto the drum from the first end toward the second end until substantially all of the belt encircles the outer surface of the drum, terminating the flow of the flowing fluid to allow the belt to contract onto the outer surface of the support drum, heating the belt to a treatment temperature of between about the glass transition temperature and about 10° C. above the glass transition temperature of the substrate or the imaging layer, the treatment temperature being the higher of these two glass transition temperatures, until the belt relaxes onto the outer circumference of the rigid drum and is substantially free of any tendency to contract back to the original circumference of the inner exposed surface prior to circumferentially expanding the belt, cooling the belt to ambient room temperature, and removing the belt from the drum, the belt having a new inner circumference substantially identical to the precisely predetermined outer circumference of the rigid cylindrical support drum.

11 Claims, 1 Drawing Sheet

METHOD OF TREATING PREFORMED FLEXIBLE IMAGING BELTS TO FORM RIPPLE-FREE AND DIMENSIONALLY PRECISE BELTS

BACKGROUND OF THE INVENTION

This invention relates in general to a method for treating a preformed flexible imaging member belt to substantially eliminate ripples from the belt.

Coated flexible belts or tubes are employed extensively in various arts. They are, for example, commonly utilized for numerous purposes such as electrostatographic imaging members, which include electrophotographic imaging members and electrographic imaging members.

Flexible electrostatographic imaging members, e.g. belts, are well known in the art. Typical electrostatographic flexible imaging members include, for example, photoreceptors (i.e. electrophotographic imaging members) for electrophotographic imaging systems and electroreceptors (e.g. ionographic imaging members) for electrographic imaging systems. Though both electrophotographic and ionographic imaging members are commonly utilized in either a belt or a drum configuration, nevertheless, the belt configuration is generally preferred based on cost and flexibility of machine design considerations. These electrostatographic imaging member belts may be seamless or seamed. Although the present invention encompasses both electrographic and electrophotographic imaging members, the discussion hereinafter will focus mainly on electrophotographic imaging members for reasons of simplicity.

For electrophotographic applications, the imaging member belts often comprise a flexible biaxially oriented thermoplastic supporting substrate coated with one or more layers including at least one layer of photoconductive material. The substrates may be inorganic such as electroformed nickel or organic such as a film forming polymer. The photoconductive coatings applied to these belts may be inorganic such as selenium or selenium alloys or organic. The organic photoconductive layers may comprise, for example, single binder layer in which photoconductive particles are dispersed in a film forming binder or multilayers comprising, for example, a charge generating layer and a charge transport layer.

Electrophotographic imaging members having a belt configuration are normally entrained around and supported by at least two rollers. Generally, one of the rollers is driven by a motor to transport the belt around the rollers during electrophotographic imaging cycles. Since electrophotographic imaging belts, particularly welded seam belts, are not perfectly cylindrical and, more specifically, tend to be slightly cone shaped, these flexible belts tend to "walk" axially along the support rollers. Belt walking causes one edge of the belt to strike one or more edge guides positioned adjacent the ends of the rollers to limit axial movement. Friction between the edge guide and the edge of the electrophotographic imaging member belt can cause the belt edge to wear, rip, buckle and otherwise damage the belt. Also, there are other serious drawbacks in terms of belt tracking and problems with good image registration. Welded belts, because of the difficulties associated with perfectly aligning overlapping ends during seam welding, are not is as concentric as desired.

Moreover, an imaging member belt fabricated by overlapping the opposite ends of an imaging member sheet and ultrasonically welding the overlapped ends to form a welded seam belt has always been observed to give rise to ripples formation near either side of the welded seam. Cross sections of these ripples exhibit a sinewave pattern which traverses across the entire width of the belt. Typical ripples seen in a seamed belt have a peak to peak height of between about 400 micrometers and about 500 micrometers and with a wavelength of from about 35 to about 45 millimeters. These ripples are clearly visible to the naked eye. Since the ripples undesirably alter the often critical distances between the belt imaging surface and devices such as optical exposure means, charging corotrons, developer applicators, transfer stations and the like, the ripples adversely affect copy print quality and are manifested as print-out defects.

Another type of electrophotographic imaging member that is well known in the art are drum type photoreceptors. Some drum photoreceptors are coated with one or more coatings. Coatings may be applied by well known techniques such as dip coating or spray coating. Dip coating of drums usually involves immersing of a cylindrical drum while the axis of the drum is maintained in a vertical alignment during the entire coating and subsequent drying operations. Although the drum photoreceptors have the benefit of being very dimensionally precise than the belt photoreceptor counterparts, yet they do have an inherent coating layer shortfall due to the vertical alignment of the drum axis during the coating operation, the applied coatings tend to be thicker at the lower end of the drum relative to the upper end of the drum due to the influence of gravity on the flow of the coating material. Drum coatings applied by spray coating technique can also be uneven, e.g., the well known orange peel effect. Coatings that have an uneven thickness do not have uniform electrical properties at different locations of the coating. Also, the coating of drums in a batch operation is time consuming and costly. In addition, the many handling steps required for batch drum coating processes tend to increase the likelihood that one or more coatings will be damaged or contaminated. Although the drum photoreceptor configuration produces excellent precise dimensions compared to belt photoreceptors, dip or spray coated photoreceptor drums do not exhibit the superior electrophotographic characteristics of flexible electrostatographic imaging belts. Moreover, the coatings are difficult to remove without damaging the underlying drum during reclaiming operations thereby rendering the drum less suitable for recycling.

INFORMATION DISCLOSURE STATEMENT

U.S. Pat. No. 5,021,109 to Petropulos et al., issued Jun. 4, 1991—A process is disclosed for preparing a multilayered belt comprises heating a substrate formed of a polymeric material, the substrate having a predetermined inner circumference, to at least about the glass transition temperature of the polymeric material and then placing the sleeve on a cylindrical mandrel. The mandrel has an outer circumference slightly greater than the predetermined inner circumference of the seamless tube. The substrate on the mandrel is subsequently coated to form a multilayered composite belt. The composite belt is then heated to a temperature of at least about the glass transition temperature of the substrate and the composite structure is removed from one end of the mandrel. Removal of the composite belt from the mandrel may be facilitated by any suitable means such as small drive elastomeric rollers, vacuum cups, gravity with vacuum assist and the like. Upon cooling, the composite structure has the predetermined inner circumference.

U.S. Pat. No. 5,518,854 issued to Yu et al. on May 21, 1996—A method of fabricating a cylindrical device comprising having at least one distinct outer layer comprising providing a performed rigid cylindrical support drum having a predetermined outer circumference, a first end and a second end, providing a flexible belt having an inner circumference at least about 0.05 percent smaller than the outer circumference of the support drum, circumferentially expanding the belt with a flowing fluid under pressure until the circumference of the inner surface of the belt adjacent the first end is stretched to a new dimension at least about 0.1 percent greater than the outer circumference of the support drum while maintaining an elongation strain less than the elastic limit of the belt, sliding the belt onto the support drum from the first end toward the second end of the support drum until substantially all of the belt encircles the outer surface of the support drum and terminating the flow of the flowing liquid to allow the belt to contract onto the outer surface of the support drum. The fluid may either be a gas or a liquid. The cylindrical device fabricated by this process is preferably an electrostatographic imaging member. This electrostatographic imaging member may be utilized in an electrostatographic imaging process.

U.S. Pat. No. 5,376,491 issued to Krumberg et al. on Dec. 27, 1994—An organic photoconductor including a base layer formed of a first material and a photoconductive layer formed of a second material. The organic photoconductor being characterized in that when it is maintained in a curved orientation with the photoconductive layer facing outward, the photoconductive layer is subjected to less stress than the base layer. In one embodiment the first material is relatively more flexible and stretchable than said second material and the materials are pre-stressed in opposite senses. In a second embodiment the first material is relatively flexible and stretchable and the second material is an initially less flexible and stretchable material which has been chemically treated to increase its stretchability and flexibility.

U.S. Pat. No. 5,143,573 issued to Ammon et al. on Sep. 1, 1992—A device and method for applying a flexible layer to rollers, as used in graphics machines, such as printing presses or coating machines, whole roller bodies consist of a carrying rube (3). A tubular, flexible body (14) is provided which is pushed over a support tube (1) that is axially connected to a transition piece (2) and a carrying tuber (3). In the area of the transition piece (2), compressed air is admitted and is discharged at a discharge force, to generate an air cushion (15) between the tubular, flexible body (14) and the carrying tube (3), over which the tubular, flexible body (14) is pushed.

U.S. Pat. No. 4,711,833 issued to McAneney et al on Dec. 8, 1987—A process is disclosed for fabricating seamless belts comprising providing a mandrel coated with a release coating, depositing a polymer by electrostatic spraying, melting the polymer and cooling the polymer. The resulting seamless belt is removed from the mandrel prior to or after application of a ground plane layer, photogenerating layer and charge generating layer. After formation of the coated or uncoated belt, air pressure is applied to the interior of the mandrel. The air passes through holes at one end of the mandrel to lift and break the adhesive bond between the inside surface of the seamless coated or uncoated belt and the mandrel surface. The air pressure is then released and the seamless coated or uncoated belt is easily slipped off the mandrel.

U.S. Pat. No. 4,747,992 issued to D. Sypula et al. on May 31, 1988—A process is disclosed for forming a seamless belt comprising forming at least one thin uniform fluid coating of a film forming polymer on a cylindrical mandrel having a larger mass, lower thermal conductivity or larger mass and lower thermal conductivity than the film forming polymer and a critical surface tension greater than the surface tension of the fluid coating to form at least one thin coating around the mandrel, heating both the mandrel and the coating to a temperature above the apparent Tg of the solid coating to expand the coating and mandrel, cooling the coating below the apparent Tg of the solid coating prior to substantial cooling of the mandrel, cooling the mandrel whereby the mandrel contracts at a greater rate than the coating until separation occurs between the mandrel, and removing the coating from the mandrel. A fluid of air or liquid may be introduced at one or both ends of the mandrel between the mandrel surface and the deposited belt to reduce adhesion between the mandrel and the coating prior to removing the coating from the mandrel.

U.S. Pat. No. 5,039,598 issued to Abramsohn et al. on Aug. 13, 1991—A process is disclosed for preparing ionographic imaging members including providing a flexible-shrinkable tube containing a dielectric film-forming polymer having a certain Tg, charge decade and elastic memory properties, providing a cylindrical support member having an outer diameter that is less than the inner diameter of the flexible tube, applying a continuous coating of the interior of the tube or the exterior the cylindrical support member, the coating comprising an electrically conductive material, an adhesive material or mixture thereof, shrinking the tube. to bring the inner surface of the tube and the outer surface of the cylindrical support member into intimate physical contact with the continuous coating. The tube may be worked to expand the diameter so that it will fit over a cylindrical metal or conductive roll substrate. For example, one may inflate an elastomeric tube with the pressurized fluid by sealing one end of the tube and introducing the pressurized fluid into the interior of the tube through the other end. For example, one may seal the end of the tube by inserting a tapered stopper, or by pinching or heat sealing the end and later trimming the end to fix the substrate. The cylindrical support member can thereafter be inserted within the flexible tube while the tube is in the Inflated state. Subsequent removal of the pressurized fluid allows the tube to shrink around the cylindrical support member.

U.S. Pat. No. 5,100,628 issued to C. Griffiths et al. on Mar. 21, 1992—A method and apparatus for coating photoreceptors using copying machines is disclosed in which, prior to coating, an elasticity deformable material is placed around the external surface of mandrel to accommodate a belt. The thickness of the material is such that when the belt is pushed over the mandrel the deformable material is deformed and engages the interior surfaces of the belt facing the mandrel. As a result of heating and cooling steps involved during the coating process the belt contracts and expands differently than the mandrel. After coating, the coated belt is removed from the mandrel.

Thus, there is a continuing need for improved imaging belts, particularly electrostatographic imaging member belts having excellent dimensional precision equivalent to that of a drum imaging member, exhibiting improved electrostatographic imaging properties and being free of ripples.

SUMMARY OF THE INVENTION

It is, therefore, an object of the present invention to provide a process for treating flexible imaging member belts having improved physical and dimensional properties that overcome the above-noted disadvantages.

It is another object of the present invention to provide an improved electrostatographic imaging member flexible belt that maintains the best attributes of a belt and also exhibits the precise dimensions of a drum without the usual shortcomings associated with belt and drum imaging members.

It is yet another object of the present invention to provide an improved electrostatographic imaging member flexible belt that exhibits superior tracking and suppresses belt walk during dynamic image cycling in an imaging machine.

It is a further object of the present invention to provide an improved electrostatographic imaging member flexible belt having an extended functional life.

It is still another object of the present invention to provide an improved electrostatographic imaging member flexible belt which is free of ripples associated with the formation of copy print-out defects.

It is a further object of the present invention to provide an improved electrostatographic imaging member flexible belt which exhibits longer mechanical service life during repeated image cycling.

It is also a further object of the present invention to provide a process that eliminates the physical defects and conicity from a preformed seamed or seamless flexible belt.

It is yet another object of the present invention to provide an improved electrostatographic imaging member belt that can more readily be recycled.

The foregoing objects and others are accomplished in accordance with this invention by providing a method of treating a preformed flexible imaging belt comprising
providing a rigid cylindrical support drum having a precisely predetermined outer circumference, a first end and a second end,
providing a preformed flexible electrostatographic imaging belt comprising at least two physically dominant thermoplastic layers, one of the physically dominant layers comprising a substrate layer, and the other physically dominant layer comprising an imaging layer, each of the physically dominant layers having a thickness at least about 10 micrometers thicker than any other layer of said imaging belt, the imaging belt having an inner exposed surface having a circumference smaller than the outer circumference of the drum, the belt having an elastic limit and physical defects,
circumferentially expanding the belt with a flowing fluid under pressure until the circumference of the inner surface of the belt adjacent the first end of the drum is stretched to a new dimension of at least about 0.1 percent greater than the outer circumference of the rigid support drum, while maintaining the belt below the elastic limit of the belt, to smooth out the physical defects,
sliding the belt onto the drum from the first end toward the second end until substantially all of the belt encircles the outer surface of the drum,
terminating the flow of the flowing fluid to allow the belt to contract onto the outer surface of the support drum,
heating the belt to a treatment temperature of between about the glass transition temperature and about 10° C. above the glass transition temperature of the substrate or the imaging layer, the treatment temperature being the higher of these two glass transition temperature, until the belt relaxes onto the outer circumference of the rigid drum and is substantially free of any tendency to contract back to the original circumference of the inner exposed surface prior to circumferentially expanding the belt,
cooling the belt to ambient room temperature, and
removing the belt from the drum, the belt having a new inner circumference substantially identical to the precisely predetermined outer circumference of the rigid cylindrical support drum.

The treatment process of this invention eliminates the physical defects in the original belt such as wrinkles, puckers, ripples, conicity, and other coating layer dimension variations. Thus, upon removal of the belt from the rigid drum at completion of the treatment process, all the physical defects and undesirable conicity of the flexible imaging belt are eliminated and the resulting treated imaging belt precisely retains the shape of the perfectly shaped rigid drum support. To simplify nomenclature, the expression "physical defects" is employed herein to include belt deformations such as ripples, puckers, wrinkles, waves and the like that are, that can be, found in preformed flexible imaging belts.

The expression "preformed flexible imaging belt" as employed herein is defined as a pliable seamed or seamless electrostatographic imaging member belt which contains all the necessary coating layers coated on a flexible substrate support to form a complete imaging member device including at least two physically dominant thermoplastic layers; one of the two physically dominant layers comprising a substrate layer while the other physically dominant layer comprising an imaging layer, and each of the physically dominant layers having a thickness at least about 10 micrometers thicker than any other layer of the imaging belt. A "physically dominant imaging layer" as employed herein is defined as either a photoconductive layer of a single layer photoreceptor, a charge transport layer of a multilayered photoreceptor or the dielectric imaging layer of an electrographic imaging member. The "physically dominant imaging layer" should have a thickness of at least about 10 micrometers greater than any layer of the preformed imaging belt other than the substrate which is the other physically dominant layer. The thickness of the "physically dominant imaging layer" is one characteristic that distinguishes the "physically dominant imaging layer" from all the other layers carried by the substrate in electrostatographic imaging members such layers including, for example, vacuum deposited metal conductive layers, charge blocking layers, adhesive layers, charge generating layers, overcoating layers, and anti-curl backing layers. Typically, the two physically dominant layers in an electrophotographic imaging member belt are, for example, the charge transport layer and the flexible substrate.

The heat treatment of the preformed imaging member belt structure involves, heating of the belt to a temperature between about the glass transition temperature and about 10° C. above the higher glass transition temperature (Tg) of the two physically dominant layers The fluid to circumferentially expand the belt may either be a gas or a liquid. The mounting of a flexible tube or belt onto a rigid drum support is described in U.S. Pat No. 5,518,854, the entire disclosure thereof being incorporated herein by reference.

The heat treatment process of this invention eliminates physical defects in the original belt. The physical defects frequently observed in flexible belts include wrinkles, puckers, ripples, conicity, and coating layer dimension variances from the belt. Following treatment, the belt is allowed to cool down to ambient room temperature. When removed from the rigid drum after cooling, again by fluid expansion, it has been found that all the physical defects and conicity of the flexible imaging belt have been eliminated and the imaging belt treated by the process of this invention retains the precise shape of the rigid drum support with the inner circumference of the belt being substantially equal to the outer circumference of the drum.

BRIEF DESCRIPTION OF THE DRAWING

A more complete understanding of the method and process of the present invention can be readily perceived by reference to the accompanying Figure which is a schematic sectional representation of part of a flexible imaging member belt mounted over is a dimensionally precise rigid cylindrical support drum.

DETAILED DESCRIPTION OF THE DRAWING

The invention will be described in relation to a process for treating an imaging belt to produce a dimensionally precise flexible electrostatographic imaging member belt which has minimum conicity and is substantially free of belt ripple defects.

Figure 1:
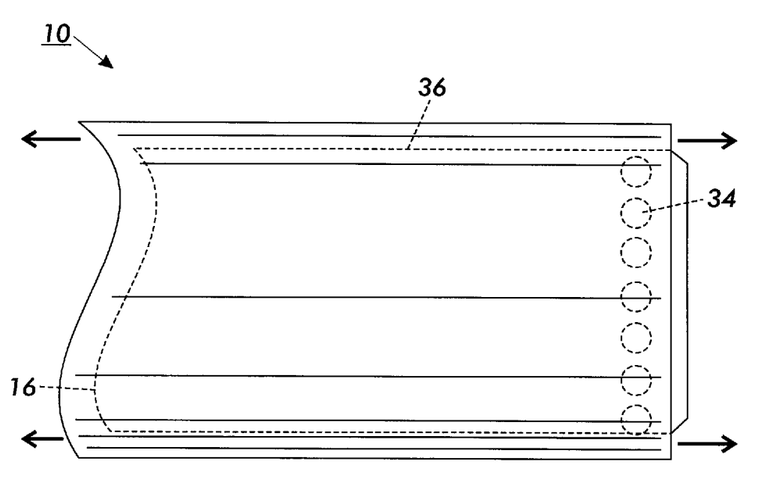

In the Figure, a flexible electrostatographic imaging member belt 10 is illustrated surrounding and coaxially aligned with rigid support drum 16. Belt 10 is separated from drum 16 by a thin film of pressurized fluid, such as air, introduced through apertures 34 into the space between the inner exposed surface of belt 10 and the outermost surface 36 of drum 16. The fluid is eventually expelled at each end of belt 10 as shown by the arrows.

Any suitable thin flexible belt may be mounted and treated on the rigid cylindrical support drum. The exposed outer surface of the rigid drum support for belt mounting preferably comprises adhesive material to ease and facilitate belt removal from the rigid drum support after the heat treatment process. Typical adhesive materials include, for example, anodized aluminum, metal stearates, fatty amides, and polymers such as fluorocarbon polymers, polysiloxanes, waxy polyethylene, waxy polypropylene, polyimides, and the like.

Flexible imaging member belts, such as thin electrostatographic imaging member belts, are well known in the art. Typical thin flexible electrophotographic imaging belts are described, for example, in U.S. Pat. No. 4,265,990, U.S. Pat. No. 4,747,992, U.S. Pat. No. 4,711,833 and U.S. Pat. No. 3,713,821, the entire disclosures of these patents being incorporated herein by reference. The flexible belt may have a welded seam or may be seamless. The belt should be flexible and stretchable. The expression "flexible", as used herein, is defined as bendable without exhibiting mechanical failure such as when cycled around various sizes of conventional support rollers during electrostatographic imaging process in an automatic copier, duplicator or printer. The word "stretchable", as utilized herein, is defined as readily extendible to a moderate strain without rupture in response to an applied stress. Preferably, the belt should be capable of stretching to at least greater than about 0.1 percent strain without exceeding its elastic limit. The expression "elastic limit" as employed herein is defined as the maximum elongation a material can be extended such that the material is able to retract precisely to its original dimension upon the release of the applied extension force. In general, the elastic limit is determined from the linear region of a stress-strain relationship plot in which the strain is directly proportional to the applied stress. Within this limit, a material under stress will retract and recover its original dimension due to elastic contraction when the applied stress is removed.

Although the belt of this invention comprises a flexible thermoplastic physically dominant imaging layer and a flexible thermoplastic physically dominant substrate layer, it may also comprise other layers comprising any suitable inorganic materials, organic materials or combinations of inorganic and organic materials that are flexible and stretchable. The physically dominant layers of the belt and, optionally any other layer, comprise any suitable flexible and stretchable thermoplastic film forming polymer. Typical thermoplastic film forming polymers include polyethylene, terephthalate polymers, polycarbonates, polysulfone, polyacrylates, polyarylates, polyvinylidene fluoride, polyvinyl chloride, polystyrene, and the like. Preferably, the film forming polymers have a glass transition temperature of between about 65° C. and about 220° C.

For electrostatographic imaging belts having a seam, the outer circumference of the belt after mounting and contracting on a rigid cylindrical drum, for imaging applications, is preferably at least about as long as the width of the receiving member to which a toner image is transferred to ensure that the entire receiving member surface can be imaged with transferred toner material. Belts having a seam are usually formed by welding the overlapped ends of a cut sheet with the welded seam extending from one edge to the opposite edge of the imaging belt in a direction parallel to the axis of the belt. Generally, the outer circumference of a seamed belt is preferably at least about 22 centimeters in order to provide adequate surface area to accommodate the width of a conventional size toner image receiving member (i.e., a standard size 8.5 inch (22 cm)×11.5 inch (29 cm) paper) as well as to permit facile mounting of the belt onto a rigid drum. For electrophotographic imaging machines dedicated to forming images on envelopes, calling cards and the like, the outer circumference of the seamed belt should preferably have a surface area at least sufficient for positioning conventional processing stations such as a cleaning blade, a charging device, a development station, an erase lamp, and the like around the belt assembly.

There is no apparent maximum limit to the circumference of the inner surface of the belt. However, with larger circumferences, handling of the belt during the circumferential stretching and mounting steps may become somewhat difficult for a single worker. Normally, there is considerable latitude as to the circumferential dimension of the belt selected. Typically, for electrostatographic imaging applications, the circumference of the belt is slightly greater than about 8.5 inches (22 cm) to accommodate imaging on common receiving member surfaces. Typical circumferences for a seamed electrostatographic imaging belt are between about 22 cm and about 130 cm. A preferred range is between about 23 cm and about 110 cm. Optimum results are achieved with a range between about 45 cm and about 90 cm. If the belt is seamless, the inner circumference of electrostatographic imaging belts can be conveniently small because there is no seam to disrupt the images being transferred to the receiving member, e.g., a standard letter size sheet.

Any suitable belt thickness may be utilized. Typical belt thicknesses fall with the ange of between about 25 micrometers and about 250 micrometers. A preferred thickness is between about 50 micrometers and about 200 micrometers. An optimum belt thickness is between about 75 micrometers and about 130 micrometers.

The electrophotographic imaging member belt may comprise only a single imaging layer on a substrate. Generally, such a single imaging layer comprises photoconductive particles dispersed in a thermoplastic film forming polymer. Electrophotographic flexible belt imaging members comprising single imaging layers or multiple imaging layers, such as a thin charge generating layer in combination with a thicker charge transport layer, are well known in the art. The imaging member belt may be seamed or seamless. It is usually that a flexible substrate is provided having an electrically conductive surface. For typical electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto an adhesive layer, if present, or directly over the blocking layer, and a charge transport layer is subsequently formed on the charge generation layer. For ionographic imaging members, an electrically insulating dielectric imaging layer is applied to the electrically conductive surface. The substrate may contain an optional anti-curl back coating on the side opposite from the side bearing the charge transport layer or dielectric imaging layer.

The flexible belt substrate comprises thermoplastic film forming material and may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting thermoplastic materials, there may be employed various resins known for this purpose including polyesters, polycarbonates, polyamides, polyurethanes, polysulfones, and the like which are flexible and which may optionally be in the form of biaxially oriented thin webs. The electrically insulating or conductive substrate should be flexible and in the form of an endless flexible belt. An insulating substrate may, for example, be a biaxially oriented polyethylene naphthalate commercially available from, for example, Kaladex from ICI Americas, Inc. Preferred endless flexible belt shaped substrates comprise commercially available biaxially oriented polyesters such as Mylar, available from E. I. du Pont de Nemours & Co., Melinex, available from ICI Americas, Inc., and Hostaphan, available from American Hoechst Corporation.

The thickness of the substrate layer depends on numerous factors, including beam strength and economical considerations, and thus this layer for a flexible belt may be of substantial thickness, for example, about 175 micrometers, or of minimum thickness less than 50 micrometers, provided there are no adverse effects on the final electrostatographic imaging member. In one flexible electrophptogaphic imaging member belt embodiment, the thickness of this layer ranges from about 65 micrometers to about 150 micrometers, and preferably from about 75 micrometers to about 100 micrometers for optimum flexibility and minimum stretch when cycled around small diameter rollers, e.g. 19 millimeter diameter rollers.

The conductive layer may vary in thickness over substantially wide ranges depending on the optical transparency and degree of flexibility desired for the electrophotographic imaging member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure through an transparent rigid cylindrical support drum, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a transparent copper iodide (CuI) or a conductive carbon black dispersed in a plastic binder as an opaque conductive layer. A typical electrical conductivity for conductive layers for electrophotographic imaging members in slow speed copiers is about $10^2$ to $10^3$ ohms/square.

After formation of an electrically conductive surface, a charge blocking layer may be applied thereto to photoreceptors. Generally, electron blocking layers for positively charged photoreceptors allow holes from the imaging surface of the photoreceptor to migrate toward the conductive layer. Hole blocking layers are normally used for negatively charged photoreceptors. Any suitable blocking layer capable of forming an electronic barrier to holes between the adjacent photoconductive layer and the underlying conductive layer may be utilized. The blocking layer may be nitrogen containing siloxanes or nitrogen containing titanium compounds as disclosed, for example, in U.S. Pat. No. 4,291,110, U.S. Pat. No. 4,338,387, U.S. Pat. No. 4,286,033 and U.S. Pat. No. 4,291,110. The disclosures of U.S. Pat. No. 4,338,387, U.S. Pat. No. 4,286,033 and U.S. Pat. No. 4,291,110 are incorporated herein in their entirety. A preferred blocking layer comprises a reaction product between a hydrolyzed silane and the oxidized surface of a metal ground plane layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. The blocking layer should be continuous and have a thickness of less than about 0.2 micrometer because greater thicknesses may lead to undesirably high residual voltage.

An optional adhesive layer may be applied to the blocking layer. Any suitable adhesive layer well known in the art may be utilized. Typical adhesive layer materials include, for example, polyesters, Mor-Ester 49,000 (available from Morton International, Inc.), Vitel PE-100 (available from Goodyear Tire & Rubber), polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive or blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigments such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones, dibromo anthanthrone pigments, benzimidazole perylene, substituted 2,4-diamino-triazines disclosed in U.S. Pat. No. 3,442,781, polynuclear aromatic quinones, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamide imides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetatevinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of between about 0.1 micrometer and about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

Any suitable and conventional technique may be utilized to mix and thereafter apply the photogenerating layer coating mixture. Typical application techniques include spraying, dip coating, roll coating, wire wound rod coating, and the like. Drying of the deposited coating may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound and about 75 percent to about 25 percent by weight of a polymeric film forming resin in which the aromatic amine is soluble.

The charge transport layer forming mixture preferably comprises an aromatic amine compound. Examples of charge transporting aromatic amines represented by the structural formulae above for charge transport layers capable of supporting the injection of photogenerated holes of a charge generating layer and transporting the holes through the charge transport layer include triphenylmethane, bis(4-diethylamine-2-methylphenyl)phenylmethane; 4'-4"-bis(diethylamino)-2', 2"-dimethyltriphenylmethane, N,N'-bis(alkylphenyl)-[1, 1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder.

Any suitable inactive thermoplastic resin binder soluble in methylene chloride or other suitable solvent may be employed in the process of this invention to form the thermoplastic polymer matrix of the imaging member. Typical inactive resin binders soluble in methylene chloride include polycarbonate resin, polyvinylcarbazole, polyester, polyarylate, polyacrylate, polyether, polysulfone, polystyrene, and the like. Molecular weights can vary from about 20,000 to about 150,000.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the charge transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

The preferred electrically inactive resin materials are polycarbonate resins having a molecular weight from about 20,000 to about 150,000, more preferably from about 50,000 to about 120,000. The material most preferred as the electrically inactive resin material is poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000, available as Lexan 141 from the General Electric Company; a polycarbonate resin having a molecular weight of from about 50,000 to about 120,000, available as Makrolon from Farbenfabricken Bayer A. G. and a polycarbonate resin having a molecular weight of from about 20,000 to about 50,000 available as Merlon from Mobay Chemical Company. Methylene chloride solvent is a desirable component of the charge transport layer coating mixture for adequate dissolving of all the components and for its low boiling point.

Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008, U.S. Pat. No. 4,299,897 and U.S. Pat. No. 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

If desired, a charge transport layer may comprise electrically active resin materials instead of or mixtures of inactive resin materials with activating compounds. Electrically active resin materials are well known in the art. Typical electrically active resin materials include, for example, polymeric arylamine compounds and related polymers described in U.S. Pat. No. 4,801,517, U.S. Pat. No. 4,806,444, U.S. Pat. No. 4,818,650, U.S. Pat. No. 4,806,443 and U.S. Pat. No. 5,030,532. Polyvinylcarbazole and derivatives of Lewis acids described in U.S. Pat. No. 4,302,521. Electrically active polymers also include polysilylenes such as described in U.S. Pat. No. 3,972,717. Other polymeric transport materials include poly-1-vinylpyrene, poly-9-vinylanthracene, poly-9-(4-pentenyl)-carbazole, poly-9-(5-hexyl)-carbazole, polymethylene pyrene, poly-1-(pyrenyl)-butadiene, polymers such as alkyl, nitro, amino, halogen, and hydroxy substitute polymers such as poly-3-amino carbazole, 1,3-dibromopoly-N-vinyl carbazole and 3,6-dibromo-poly-N-vinyl carbazole and numerous other transparent organic polymeric transport materials as described in U.S. Pat. No. 3,870,516. The disclosures of each of the patents identified above pertaining to binders having charge transport capabilities are incorporated herein by reference in their entirety. Typical glass transition temperatures (Tg) for charge transport layers containing a thermoplastic polycarbonate binder and dissolved or molecularly dispersed aromatic amine small molecule charge transport molecules are between about 75° C. and about 100° C. However, Tg temperatures outside this range may be encountered with other combinations of film forming binder and small molecule charge transport materials.

Other layers such as a conventional electrically conductive ground strip may be utilized along one edge of the belt in contact with the conductive layer, blocking layer, adhesive layer or charge generating layer to facilitate connection of the electrically conductive layer of the electrostatographic imaging member to ground or to an electrical bias through typical contact means such as a conductive brush, conductive leaf spring, and the like. Ground strips are well known and usually comprise conductive particles dispersed in a film forming binder.

Optionally, an overcoat layer may also be utilized to protect the charge transport layer and improve resistance to abrasion. In some cases an anti-curl back coating may be applied to the rear side of the substrate to provide flatness and/or abrasion resistance. These overcoating and anti-curl back coating layers are well known in the art and may comprise thermoplastic organic polymers or inorganic polymers that are electrically insulating or slightly semi-conductive. Overcoatings are continuous and generally have a thickness of less than about 10 micrometers. The thickness of anti-curl backing layers should be sufficient to substantially balance the total curling forces of the imaging layer or layers on the opposite side of the supporting substrate layer.

For electrographic imaging members, a flexible dielectric layer overlying the conductive layer may be substituted for the active photoconductive layers. Any suitable conventional, flexible, stretchable, electrically insulating, thermoplastic dielectric polymer matrix material may be used in the dielectric layer of the electrographic imaging member. Typical electrographic imaging members are described in U.S. Pat. No. 5,073,434, the entire disclosure thereof being incorporated herein by reference.

Any suitable cylindrical support drum may be utilized. Preferably, the drum is rigid. The drum may comprise any suitable inorganic material, organic material, or a combination of inorganic and organic materials. Typical inorganic drums comprise, for example, a metal such as aluminum. Typical organic drums comprise a thermoplastic resin or thermosetting resins. The resulting resin drum may contain a filler or fillers if desired. The region of the outer surface of the rigid cylindrical support drum underlying the is belt should be substantially free of any irregularities which would distort the imaging surface of the electrophotographic imaging member belt and adversely affect the quality of toner images formed on the imaging surface. Thus, for example, the particle size of any fillers used in a resin drum should sufficiently small so that the fillers do not project so far above the outer average surface of the drum that it adversely affects the quality of toner images formed on the imaging surface. It is crucially important that the structural strength of the rigid support drum should be sufficient to permit the drum to remain rigid and resist deformation during and after mounting of the belt onto the drum as well as throughout the entire heat treatment process. In other words, the structural strength of the rigid support drum should be sufficient to prevent a thin walled support drum from buckling under the compression pressure exerted by the belt after belt mounting.

The circumference size selected for the rigid cylindrical support drum depends upon the arc distant of the imaging surface of the belt. Thus, if a welded belt is utilized and the minimum size of the receiving member to be imaged is 8.5 inches (21.6 cm), the outer circumference of the rigid cylindrical support member should be at least about 22 cm. For a seamless belt, the outer circumference should be at least about 8 cm. The length of the supporting rigid cylinder may be slightly less, the same as, or slightly greater than the width of the belt. However, it is preferred that the surface of the drum underlies at least the imaging areas of the belt.

The rigid cylindrical support drum may be fitted with apertures on the outer periphery of the drum at one end of the drum, to introduce channeled streams of fluid under pressure into the region between the belt and the outer surface of the rigid cylindrical support drum to facilitate stretching of the belt during mounting of the belt onto the drum. Alternatively, an adjacent auxiliary mounting cylinder or ring may be utilized as a source of compressed fluid to stretch the belt during mounting of the belt onto the supporting cylindrical substrate. The size and number of apertures to be utilized in either the rigid cylindrical support drum substrate or in the auxiliary mounting drum or ring for stretching of the belt during the belt mounting process should be sufficient to achieve an equilibrium fluid pressure between the outer surface of the drum and the inner surface of the belt. Satisfactory results may be achieved when the equilibrium pressure of the fluid is between about 0.4 psi (28.2 gms/cm$^2$) and about 5 psi (352 gms/cm$^2$). Preferably, the equilibrium fluid pressure is between about 0.7 psi (49.3 gms/cm$^2$) and about 4 psi (282 gms/cm$^2$). Optimum results are achieved when the equilibrium pressure is between about 1 psi (70.4 gms/cm$^2$) and about 3.5 psi (246.3 gms/cm$^2$). For an imaging belt having a thickness of about 120 micrometers and a Young's Modulus of about $5.0 \times 10^5$ psi ($3.52 \times 10^7$ gms/cm$^2$), the equilibrium fluid pressure required should be sufficient to stretch the circumferential dimension of the belt to an expanded circumferential dimension of at least about 0.1 percent greater than the outer circumference of the rigid cylindrical support drum but less than the elastic limit of the belt. The amount of equilibrium fluid pressure desired depends upon how readily the belt stretches which, in turn, is determined by the thickness of the belt and the Young's Modulus of the belt.

Generally, the mounting of the belt onto a rigid cylindrical support drum is accomplished at temperatures below the material permanent deformation temperature of all components of the preformed flexible belt. For example, the mounting should be undertaken at temperatures below the glass transition temperature of any polymeric component of the preformed belt; however, it is preferably at the room ambient temperature. It Is crucially important to ensure that the preformed flexible belt has an inner circumference of between about 0.05 and 0.005 percent smaller than the outer surface circumference of the rigid drum support prior to stretching in order to provide adequate removal of all the physical defects and conicity from the belt during belt stretching, during belt mounting to encircle the entire support drum, while the fluid pressure is released, and during and after the heat treatment of the belt. An embodiment of the heat treatment process of the present invention is illustrated in Working Example II below.

Any suitable aperture shape may be utilized for the drum. Typical aperture shapes include round, oval, square, triangular, slotted, rhombic, rectangular, trapezoidal, and the like and combinations thereof. Generally, the apertures are positioned adjacent to the belt mounting end of the rigid cylindrical support drum. Thus, the apertures may be formed in the rigid cylindrical support drum itself or in an adjacent auxiliary mounting cylinder or mounting ring (essentially a shortened mounting cylinder), if an auxiliary mounting cylinder or mounting ring is utilized for belt transport. Moreover, where a mounting ring or mounting cylinder is employed, apertures may be employed in both the rigid cylindrical support drum and in the mounting ring or cylinder. In addition, one or more rows of apertures may be used in the rigid supporting drum and/or mounting ring or mounting cylinder. Any suitable number of apertures may be utilized around the periphery of the rigid supporting drum, mounting ring or mounting cylinder. Generally sufficient apertures should be utilized to achieve the desired equilibrium pressure for stretching of the belt. Generally, large diameter apertures are less desirable because large dimples can form on the outer surface of the belt after the fluid pressure has been removed and the belt has been allowed to shrink against the rigid supporting substrate. When an end of the rigid cylindrical support drum contains a plurality of circumferentially located apertures and an edge of an imaging belt overlies the apertures, the apertures should preferably not be under the region of the belt that will be used for imaging because the underlying apertures can cause distortion of the imaging surface of the belt.

Any suitable fluid may be utilized to stretch the belt. Typical fluids include air, nitrogen, carbon dioxide, argon, helium, fluorocarbon, chlorofluorocarbon, water, alcohol, and the like. Air is preferred because it is inexpensive, non-toxic and leaves no residual debris. The fluid may be compressible or non-compressible. Generally, the fluid is supplied to manifolds which feed the fluid to the apertures. Preferably, the interior volume of the manifolds is small to minimize the volume of fluid required and to maximize the effect of belt stretching speed. Any suitable means may be utilized to regulate the pressure supplied to the inner manifolds. Typical regulating means include, for example, conventional pressure regulator valves.

The fluid may be supplied from any suitable source such as a storage tank, electrical or mechanical compressor, a turbo compressor, pressurized cylinder and the like. Although a pulsating of fluid may be utilized, the fluid source supplying fluid under conventionally uniform pressure is preferred. Although a variety of compressed gases and liquids have been identified above, gases such as air and nitrogen are generally the preferred fluids from cost and ease of handling considerations.

If desired, the rigid cylindrical support drum may be fitted with several devices at the end of the drum opposite the mounting end to stop the belt as it is slid onto the drum. Any suitable belt stopping devices may be utilized such as pegs, tape, ridge, pins, and the like.

Thus, the imaging members of this invention achieve more precise tolerances, can be readily recycled, are less expensive, extend the cycling life of belts and the like.

The invention process will now be described in detail with respect to specific preferred embodiments thereof, it being noted that these examples are intended to be illustrative only and are not intended to limit the scope of the present invention. Parts and percentages are by weight unless otherwise indicated.

EXAMPLE I

An electrophotographic imaging member web was prepared by providing a roll of titanium coated biaxially oriented thermoplastic polyester (Melinex, available from ICI Americas Inc.) substrate having a thickness of 3 mils (76.2 micrometers) and applying thereto, using a gravure applicator, a solution containing 50 parts 3-aminopropyltriethoxysilane, 50.2 parts distilled water, 15 parts acetic acid, 684.8 parts of 200 proof denatured alcohol, and 200 parts by weight heptane. This layer was then dried to a maximum temperature of 290° F. (143° C.) in a forced air oven. The resulting blocking layer had a dry thickness of 0.05 micrometer.

An adhesive interface layer was then prepared by applying to the blocking layer a wet coating containing 5 percent by weight, based on the total weight of the solution, of polyester adhesive (Mor-Ester 49,000, available from Morton International, Inc.) in a 70:30 volume ratio mixture of tetrahydrofuran/cyclohexanone. The adhesive interface layer was dried to a maximum temperature of 275° F. (135° C.) in a forced air oven. The resulting adhesive interface layer had a dry thickness of 0.07 micrometer.

The adhesive interface layer was thereafter coated with a photogenerating layer containing 7.5 percent by volume trigonal selenium, 25 percent by volume N,N'-dipheny-N, N'-bis(3-methylphenyl)-1,1'-biphenyl-4,4'-diamine, and 67.5 percent by volume polyvinylcarbazole. This photogenerating layer was prepared by introducing 160 gms polyvinylcarbazole and 2,800 mls of a 1:1 volume ratio of a mixture of tetrahydrofuran and toluene into a 400 oz. amber bottle. To this solution was added 160 gms of trigonal selenium and 20,000 gms of ⅛ inch (3.2 millimeters) diameter stainless steel shot. This mixture was then placed on a ball mill for 72 to 96 hours. Subsequently, 500 gms of the resulting slurry were added to a solution of 36 gms of polyvinylcarbazole and 20 gms of N,N'-diphenyl-N,N'-bis(3-methylphenyl)-1,1'-biphenyl-4,4'-diamine dissolved in 750 mls of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). However, a strip about 3 mm wide along one edge of the coating web, having the blocking layer and adhesive layer, was deliberately left uncoated by any of the photogenerating layer material to facilitate adequate electrical contact by the ground strip layer that is applied later. This photogenerating layer was dried to a maximum temperature of 280° F. (138° C.) in a forced air oven to form a dry thickness photogenerating layer having a thickness of 2.0 micrometers.

This coated imaging member web was simultaneously overcoated with a charge transport layer and a ground strip layer by coextrusion of the coating materials. The charge transport layer was prepared by introducing into an amber glass bottle in a weight ration of 1:1 N,N'-diphenyl-N,N'-bis(3-methylphenyl)-1,1'-biphenyl-4,4'-diamine and Makrolon 5705, a polycarbonate resin having a molecular weight of about 120,000 commercially available from Farbensabricken Bayer A.G. The resulting mixture was dissolved to give 15 percent by weight solid in methylene chloride. This solution was applied on the photogenerator layer by extrusion to form a coating which upon drying gave a thickness of 24 micrometers.

The strip, about 3 mm wide of the adhesive layer left uncoated by the photogenerator layer, was coated with a ground strip layer during the coextrusion process. The ground strip layer coating mixture was prepared by combining 23.81 gms. of polycarbonate resin (Makrolon 5705, 7.87 percent by total weight solids, available from Bayer A.G.), and 332 gms of methylene chloride in a carboy container. The container was covered tightly and placed on a roll mill for about 24 hours until the polycarbonate was dissolved in the methylene chloride. The resulting solution was mixed for 15–30 minutes with about 93,89 gms of graphite dispersion (12.3 percent by weight solids) of 9.41 parts by weight graphite, 2.87 parts by weight ethyl cellulose and 87.7 parts by weight solvent (Acheson Graphite dispersion RW22790, available from Acheson Colloids Company) with the aid of a high shear blade dispersed in a water cooled, jacketed container to prevent the dispersion from overheating and losing solvent. The resulting dispersion was then filtered and the viscosity was adjusted with the aid of methylene chloride. This ground strip layer coating mixture was then applied, by coextrusion with the charge transport layer, to the electrophotographic imaging member web to form an electrically conductive ground strip layer having a dried thickness of about 14 micrometers.

The resulting imaging member web containing all of the above layers was then past through a maximum temperature zone of 240° F. (116° C.) in a forced air oven to simultaneously dry both the charge transport layer and the ground strip.

An anti-curl coating was prepared by combining 88.2 gms of polycarbonate resin (Makrolon 5705, available from Goodyear Tire and Rubber Company) and 900.7 gms of methylene chloride in a carboy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear dispersion to form the anti-curl coating solution. The anti-curl coating solution was then applied to the rear surface (side opposite the photogenerator layer and charge transport layer) of the electrophotographic imaging member web by extrusion coating and dried to a maximum temperature of 220° F. (104° C.) in a forced air oven to produce a dried coating layer having a thickness of 13.5 micrometers.

EXAMPLE II

The electrophotographic imaging member web of Example I, having a width of 414 mm, was cut to a precise 591 mm length to form a rectangular sheet. The opposite ends of this imaging member sheet were overlapped 1 mm and joined by ultrasonic energy seam welding using a 40 Khz horn to form a belt having an inner circumferential dimension of 590 millimeters. This imaging belt was prepared to achieve an inner circumferential dimension about 0.05 percent smaller than the outer circumferential dimension of a precisely dimensioned rigid aluminum support drum such that when mounted and encircling around the rigid drum it would yield a belt tension not greater than 1.08 pound per inch width of the belt. This seamed imaging member belt was found to have wrinkles, puckering, and areas of visible ripples physical defects which had been determined to be caused by coating layers imperfection. Moreover, the belt had also been found to have a conicity exceeding an acceptable belt circumference specification limit. The belt was then mounted onto the rigid drum to form a belt/drum assembly similar to that shown in the Figure. The belt mounting was successfully achieved by employing a pneumatic mounting technique, using a compressed air source to provide an equilibrium air pressure of 4.0 psi, (281.2 gms per square centimeter) to substantially expand the belt and enable belt mounting. The rigid aluminum support drum had an outer circumferential dimension of 590.3 mm and an axial length of 41.4 cm. The end of the drum onto which the belt was slid carried 8 round holes evenly spaced around the periphery, the center of the holes being 3 mm from the end of the drum upon which the belt was slid. Each of the holes had a diameter of 2 millimeters. The opposite ends of the drum were sealed with covers. The cover farthest from the holes carried an air feed fitting to which a tube was attached. Compressed air was fed into the drum through the tube from a compressed air source with the air pressure being controlled by a pressure regulator. When the edges of the mounted belt were aligned with each end of the drum, the supply of the compressed air was terminated and the belt collapsed instantly to encircle and hug the drum.

Under the 0.05 percent wrap around strain, the imaging belt would produce a 1.08 pound/inch (193.2 gms per centimeter axial drum length) belt tension to cause the belt to intimately hug the rigid support drum. Since the aluminum support drum had a Young's modulus of $10^3 \times 10^5$ pounds/inch$^2$ (72.43×10$^7$ gms per square centimeter), it is 21 times greater than the Young's modulus of 4.9×10$^5$ pounds/inch 2 (3.446×10$^7$ gms per square centimeter), of the imaging belt. Furthermore, the rigid support drum had a wall thickness of at least 100 times greater than the thickness of the imaging belt. Therefore, the rigid aluminum support drum was virtually incompressible under the pressure exerted by the belt and was seen to exhibit no dimensional changes as a result of the radial compression force arising after imaging belt mounting.

The belt was then subjected to the heat treatment process of this invention at a temperature of 90° C. which was 8° C. above the Tg of the charge transport layer and 15° C. over the Tg of the biaxially oriented polyester, for 20 minutes in an air circulating oven, then followed by cooling the assembly to ambient room temperature. When the treated belt was removed from the drum support by using the pneumatic belt expansion procedures described above all the wrinkles, puckers, ripples, and conicity in the belt were eliminated. Interestingly, the belt was also observed to retain the precise shape of the rigid drum support.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A method of treating a preformed flexible imaging belt comprising providing a rigid cylindrical support drum having a precisely predetermined outer circumference, a first end and a second end, providing a preformed flexible electrostatographic imaging belt comprising at least two physically dominant thermoplastic layers, one of the physically dominant layers comprising a substrate layer, and the other physically dominant layer comprising an imaging layer, each of the physically dominant layers having a thickness at least about 10 micrometers thicker than any other layer of said imaging belt, the imaging belt having an inner exposed surface having a circumference smaller than the outer circumference of the drum, the belt having an elastic limit and physical defects, circumferentially expanding the belt with a flowing fluid under pressure until the circumference of the inner surface of the belt adjacent the first end of the drum is stretched to a new dimension of at least about 0.1 percent greater than the outer circumference of the rigid support drum while maintaining the belt below the elastic limit of the belt to smooth out the physical defects, sliding the belt onto the drum from the first end toward the second end until substantially all of the belt encircles the outer surface of the drum, terminating the flow of the flowing fluid to allow the belt to contract onto the outer surface of the support drum, heating the belt to a treatment temperature of between about the glass transition temperature and about 10° C. above the glass transition temperature of the substrate or the imaging layer, the treatment temperature being the higher of these two glass transition temperatures, until the belt relaxes onto the outer circumference of the rigid drum and is substantially free of any tendency to contract back to the original circumference of the inner exposed surface prior to circumferentially expanding the belt, cooling the belt to ambient room temperature, and removing the belt from the drum, the belt having a new inner circumference substantially identical to the precisely predetermined outer circumference of the rigid cylindrical support drum.

2. A method according to claim 1 wherein the inner exposed surface of the belt has a circumference of between about 0.05 and 0.005 percent less than the outer circumference of the drum.

3. A method according to claim 1 including circumferentially expanding the belt with a flowing fluid under pressure until the circumference of the inner surface of the belt adjacent the first end of the drum is stretched to a new dimension while maintaining the belt below the elastic limit of the belt after cooling and prior to removing the belt from the drum.

4. A method according to claim 1 wherein the preformed belt has a welded seam.

5. A method according to claim 1 wherein the preformed belt is a seamless belt.

6. A method according to claim 1 wherein the preformed belt is an electrophotographic imaging belt.

7. A method according to claim 6 wherein the electrophotographic imaging belt comprises the substrate and at least a charge generating layer and a charge transport layer.

8. A method according to claim 7 wherein the charge transport layer comprises a small molecule charge transporting material dissolved or molecularly dispersed in a thermoplastic film forming polymer.

9. A method according to claim 1 including after cooling the belt, circumferentially expanding the belt with a flowing fluid under pressure until the circumference of the inner surface of the belt adjacent the first end of the drum is stretched to a new dimension greater than the outer circumference of the rigid support drum while maintaining the belt below the elastic limit of the belt and removing the belt from the drum.

10. A method according to claim 1 wherein the preformed belt is an electrographic imaging belt.

11. A method according to claim 10 wherein the imaging layer is a dielectric imaging layer.

* * * * *